June 7, 1960  A. F. GRANT  2,939,559
MAGNETIC PARTICLE COUPLING
Filed July 16, 1954  3 Sheets-Sheet 1
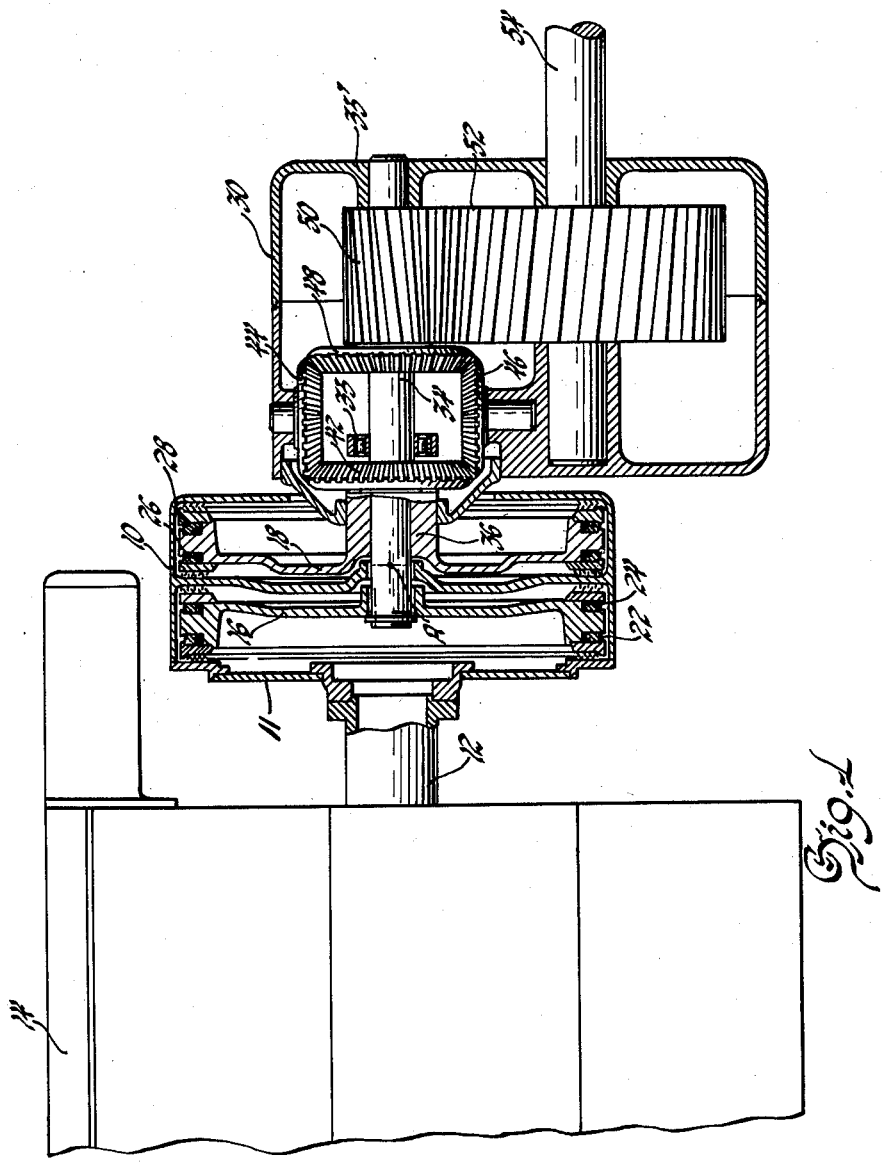
INVENTOR
Arthur F. Grant
BY
L. C. Thorpe
ATTORNEY

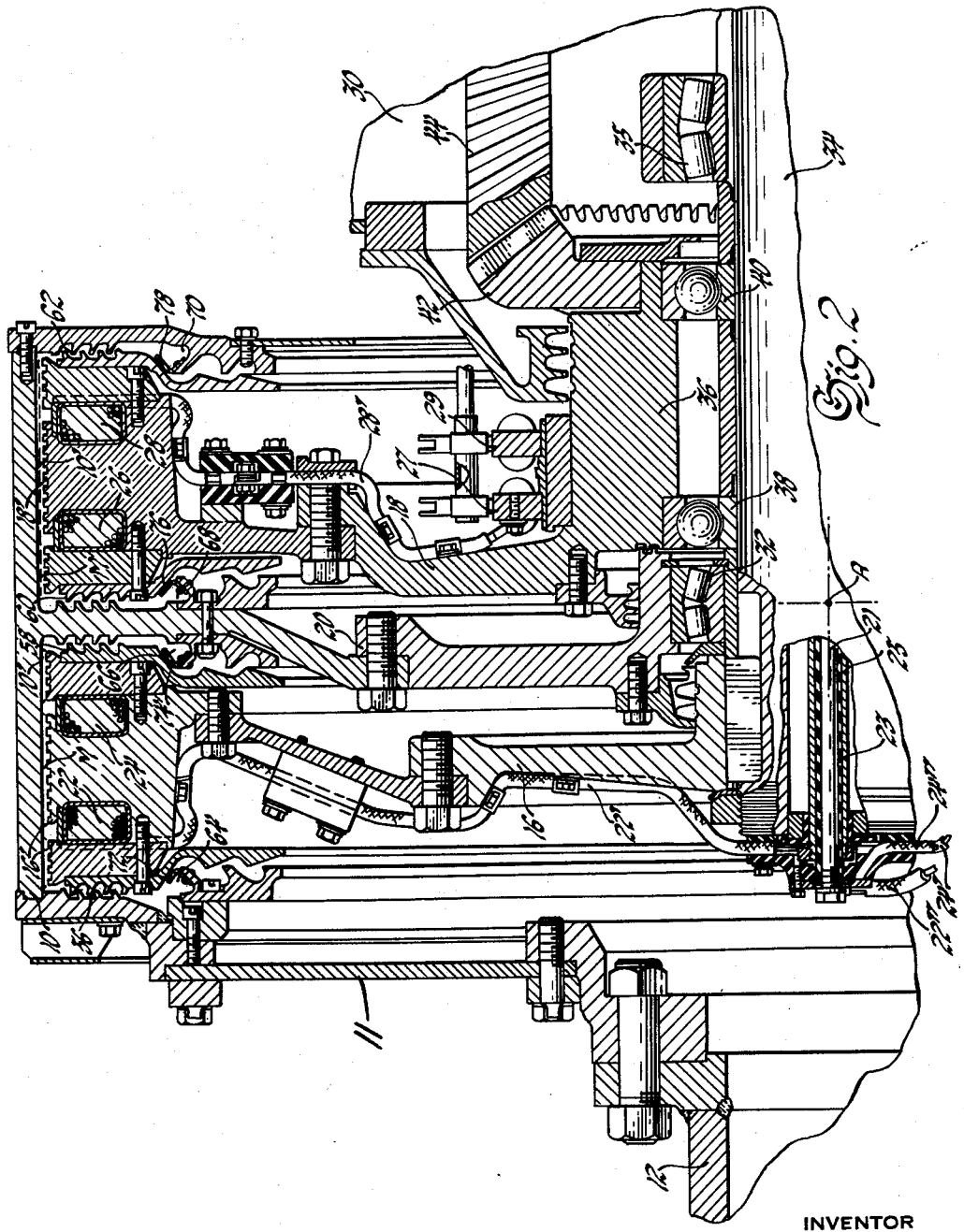

June 7, 1960 A. F. GRANT 2,939,559
MAGNETIC PARTICLE COUPLING
Filed July 16, 1954 3 Sheets-Sheet 3

INVENTOR
Arthur F. Grant
BY J. C. Thorpe
ATTORNEY

United States Patent Office 2,939,559
Patented June 7, 1960

2,939,559

MAGNETIC PARTICLE COUPLING

Arthur F. Grant, Cleveland, Ohio, assignor to General Motors Corporation, Detroit, Mich., a corporation of Delaware Filed July 16, 1954, Ser. No. 443,775

9 Claims. (Cl. 192—21.5)

This invention relates to magnetic coupling devices and more particularly to magnetic couplings of the type employing a mixture of magnetic particles such as iron and a lubricating vehicle which when subjected to a magnetic field acts to transmit force between two otherwise independently movable members; such magnetic couplings being particularly adapted, among other uses, for coupling a prime mover to a rotatable load whereby the rotation of the load may be controlled.

Magnetic particle couplings have evolved from electromagnetic couplings of the eddy-current type in which high intensity magnetic fields created across a small air gap are relied upon to produce a magnetic drag effect between driving and driven members. In such eddy-current couplings the effectiveness of the coupling action as indicated by the slip or difference in rotation of the driving member with regard to the driven member is dependent upon the magnetic field strength. The air-gap alignment between the rotating clutch members in these couplings is critical due to the inherent tendency of two magnetic elements separated by an air gap to close that air gap at that point where the air gap is smallest. This effect which is known as pullover tendency results in cyclic flexures of the rotating elements thereby inducing destructive vibrations. This pullover tendency is common to all direct current electric motors and generators but is particularly exaggerated in the case of eddy-current couplings due to the high intensity magnetic fields utilized. Consequently, pilot bearings between the driving and driven shafts have been found to be essential in maintaining proper air-gap alignment between the clutch elements in eddy-current couplings.

In magnetic particle couplings the magnetic drag between the driving and driven members is exerted through the magnetic particle mixture which substantially fills the air gap when a magnetic field is established in one of the members. Since magnetic particle couplings have generally evolved from eddy-current clutches, those skilled in the art have felt that similar pilot bearings for the maintenance of proper air-gap alignment between the clutch elements were necessary in magnetic particle couplings. However, the use of such pilot bearings have presented problems of alignment, thermal expansion, vibration dampening, and maintenance in magnetic couplings of either the eddy current or magnetic particle type in various types of installations such as marine and vehicular applications.

The primary object of this invention is to provide an improved magnetic particle coupling which may be used as a self-aligning coupling by the elimination of pilot bearings rigidly maintaining air-gap alignment between the rotating clutch elements.

Actual tests with magnetic particle couplings constructed in accordance with this invention indicate that such magnetic particle couplings tend to be self-centering and are capable of accommodating substantial amounts of angular and lateral misalignment between the clutch elements. While it is probably inaccurate to say that such couplings have no pullover tendency, it has been found that from a practical standpoint the pullover tendency effect in such couplings is practically negligible due to the reduced reluctance between the clutch members across the air gap and that a centering effect is provided by the energized magnetic particles which tend to prevent any such pullover between the rotating clutch elements. Consequently, the pullover effect is practically nullified under dynamic operating conditions thus permitting the use of such magnetic particle couplings in applications requiring the accommodation of misalignment between the input and output elements of the coupling. However, such alignment accommodating operation is not normally possible where an excess (more than required for normal torque capacity) of the magnetic particle mixture is introduced into the air gap area or if displacement of one rotating member with respect to the other is reduced to the point that positive physical interference is established between the magnetic particles and the rotating surfaces enclosing them. Actual tests have demonstrated that a minimum of approximately 80% of the total available air gap freedom of movement may be utilized for alignment purposes when using a magnetic particle mixture "fill" of from 50% to 130% of the nominal air gap volume without impairing the operation of the coupling. As indicated above this is contra to the past thinking of those skilled in the art.

The specific nature of the invention as well as other objects and advantages will clearly appear from the description of the preferred embodiments shown in the accompanying drawings in which:

Figure 1 is a diagrammatic view of a power train including a two-way dry particle magnetic clutch embodying the invention.

Figure 2 is an enlarged sectional view of a two-way clutch similar to that shown diagrammatically in Figure 1.

Figure 3:
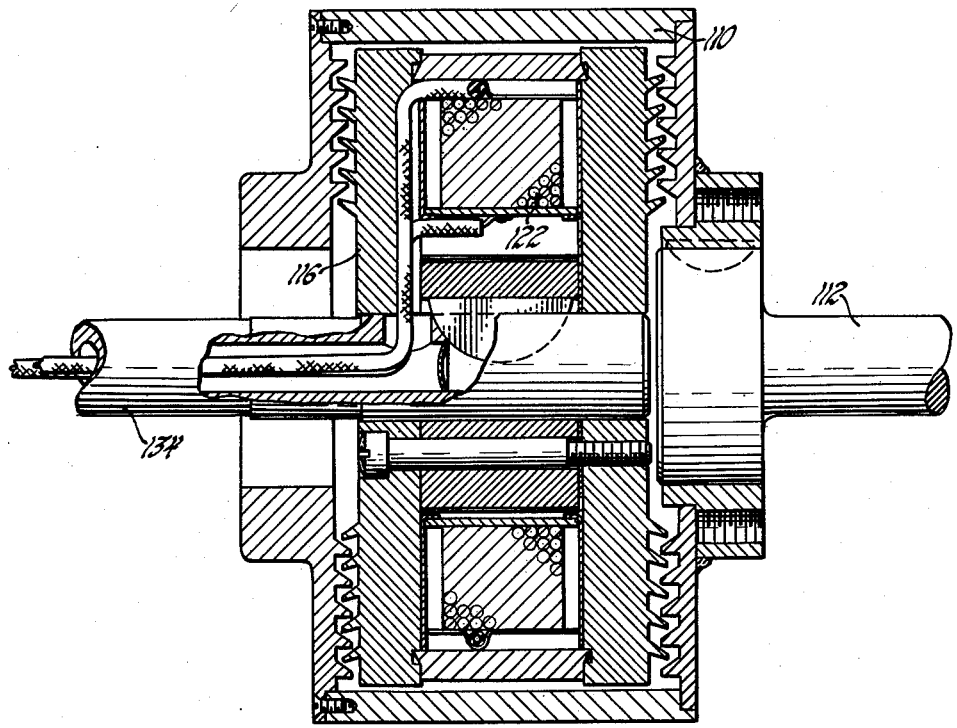
Figure 3 is a sectional view of a one-way clutch embodying the invention.

Referring to Figures 1 and 2, an inductor member 10 in the form of a drum-shaped shell constitutes the driving element of the coupling. The inductor drum 10 is suitably attached by a substantially flat drive plate or spider 11 to a driving shaft 12 which is in turn driven by a prime mover 14 such as an internal combustion engine. A pair of driven members 16 and 18 are rotatably mounted to extend within the driving shell 10 from a reversing gear box 30 and are separated by a web 20 carried by the inductor shell. The forward drive member 16 is secured to a shaft 34 journaled in the reversing gear box as indicated at 35 and 35' and by a self-aligning roller bearing 32 carried by the web 20. The self-aligning roller bearing 32 permits angular misalignment between the shafts 12 and 34 about the intersection of the transverse center line of the roller bearing 32 and the longitudinal center line of the driven shaft 34 as indicated by the point A in Figure 2. It will be noted that such angular misalignment about the point A results in lateral displacement and eccentricity of the driven members 16 and 18 with respect to the inductor shell 10. The hub 36 of the reverse drive member 18 is journaled on the shaft 34 by the roller bearings 38 and 40. A pinion gear 50 secured to the shaft 34 meshes with a main gear 52 to provide forward drive through the power train output shaft 54 when the member 16 is coupled to the drive member 10. When the member 18 is coupled to the driving shell 10, the direction of rotation of the shaft 34, and consequentially of shaft 54, is reversed through a differential gear arrangement including a bevel gear 42 secured to the hub 36 and meshing with two bevel idler gears 44 and 46 which in turn drive a bevel gear 48 secured to the shaft 34.

The driven members 16 and 18 are essentially electromagnets being provided with annular field coil windings 22, 24, and 26, 28, respectively, which are capable of being selectively energized to provide either forward or reverse drive, respectively, through a reversing gear box 30 in the manner described below. The annular field coil windings 22 and 24 in the driven member 16 are connected by the leads 22', 22" and 24', 24", respectively, to concentric conducting rails 21 and 25 extending through the shaft 34. The concentric rails 21 and 25 are separated by a cylindrical insulator 23. The annular field coil windings 26 and 28 of the driven member 18 are connected by suitable leads, only one of which 28' is shown, to the slip rings 27 and 29. The conductor rails 21 and 25 and the slip rings 27 and 29 are selectively connectable to a source of direct current, not shown, through a control mechanism, also not shown, adapted to vary the potential delivered to the energized field coils. The driven members 16 and 18 are provided with face portions 16' and 18', respectively, forming electromagnetic poles about their respective field coil windings. These electromagnetic pole face portions are in opposed spaced relation to inner face portions 10' of the driving shell. The opposing face portions form air gaps therebetween.

A flowable magnetic material M of magnetically variable sheer strength such as a mixture of magnetic particles in a dry lubricant is employed in the air gaps separating the opposed face portions 10', 16' and 18' of the driving and driven members. This mixture of magnetic particles and lubricant constitutes a bonding material responsive to a magnetic field being established across the gap to effect a lubricated load transmitting bond between the face portions of the energized drive member and the driving shell. As indicated above, the energized magnetic particles accommodate any eccentricity resulting from the permitted angular or lateral misalignment between the clutch elements and provide a centering action on the clutch elements tending to minimize any possible pullover tendency, thus preventing the destructive vibrations which would otherwise be generated by such pullover.

Figure 2A:
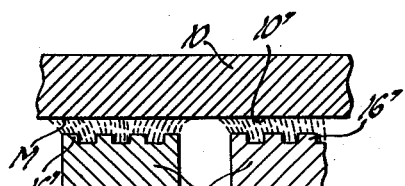
Figure 2a is a still further enlarged fragmentary view of the two-way clutch shown in Figures 1 and 2 diagrammatically showing the distribution of the magnetic particle mixture between energized clutch elements.
Figure 2B:
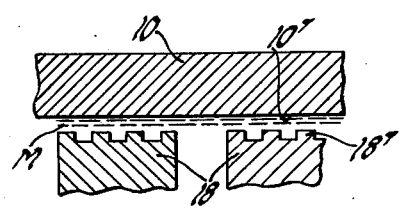
Figure 2b is a still further enlarged fragmentary view of the two-way clutch shown in Figures 1 and 2 digrammatically showing the distribution of the magnetic particle mixture between de-energized clutch elements.

To provide forward drive to the reversing gear output shaft 54 through the coupling, the annular field coil windings 22 and 24 of the member 16 are energized setting up a magnetic field magnetizing the magnetic material bridging the gap and tending to electromagnetically couple the driving member 10 and the driven member 16 together, as best seen in Figure 2a. Since the windings 26 and 28 are de-energized in forward drive through the coupling, the member 18 is uncoupled from the driving shell 10 and the magnetic material M between the members 10 and 18 will be distributed against the inner face of the member 10 by centrifugal action, as shown in Figure 2b. The extent to which the two energized clutch members are coupled to each other is dependent upon the magnitude of the magnetic field set up between the members. This is similar to the coupling action in eddy-current couplings, but differs in that with proper field strength the two members may be magnetically locked together to rotate at the same speed through the interlocking action of the magnetic particles. When the field of member 16 is de-energized, the flowable magnetic material is released de-clutching the driven field member 16 from the driving shell or drum 10. The annular field coil windings 26 and 28 of the reversing member 18 may then be energized to couple the member 18 with the driving shell 10 thereby providing reverse drive to the shaft 54 through the gear box 30.

As indicated above, at normal engine operating speeds the rotation of the driving shell 10 will be sufficient to centrifuge the magnetic material M against its inner face 10' when the field coil of the adjacent driven member of the coupling is de-energized as best shown in Figure 2b. Upon energization of the field coils of the adjacent driven member, the magnetic particles of the material M will be magnetized to bridge the air gap separating the opposed face portions of the driving and driven member, as best shown in Figure 2a. However, when the field coils of one driven member are energized coupling it to the driving member, it will be readily seen that the other driven member is motored in the reverse direction through the differential reversing gear arrangement. Such reverse rotation sets up a certain amount of turbulence of the magnetic particle material in the air spaces separating the driving and motored member which tends to carry some of the smaller or finer particles of the magnetic material inwardly of the coupling. This tendency of the particles to move inwardly of the coupling is accentuated and may occur even when the field coils of both couplings are de-energized when the engine is being operated at relatively low speeds. Since the centrifuging action of the shell 10 on the individual particles is near a minimum at these low engine speeds, the effect of gravity is to cause these particles to fall inwardly of the coupling.

To counteract and to prevent the passage of such magnetic particles inwardly of the coupling under such conditions of operation, a series of labyrinth type particle collecting seals are provided, as indicated at 56, 58, 60 and 62. The driving shell 10 is also provided inwardly of the initial labyrinth seals with particle collecting pockets as shown at 64, 66, 68 and 70, between the shell and the driven members. These pockets are partially formed by relatively flexible V-shaped seals as indicated in 72, 74, 76 and 78, which are mounted on the end plates and web of the driving member and embracing the adjacent driven member. Particles moving inwardly of the coupling are required to change their direction before passing between the flexible seal and the driven member and tend to settle into the relatively laminar air flow of the collecting pocket until they can again be returned to the inner periphery of the drum by centrifugal force. Leakage flux and residual flux from induced magnetism occurring between the labyrinth sealing members will also serve to a limited extent to prevent movement of the particles inwardly of the coupling.

While the members 16 and 18 are shown in combination with a reversing gear, it is contemplated that they might also be selectively energizable to provide different drive ratios through suitable transmission gear arrangements, not shown.

It has been found in practice that the elimination of the bearing 32 is permissible to permit operation of the coupling with both angular and lateral misalignment with resultant eccentricity between the coupling members. However, the use of a self-aligning bearing will normally accommodate more than sufficient angular misalignment with resultant lateral displacement between the rotating clutch elements. At the same time, the bearing 32 will provide support of one clutch member with respect to another, which is often desirable from a proper weight distribution, shaft deflection, or mechanical arrangement standpoint. The use of such a self-aligning bearing arrangement permitting angular misalignment between the prime mover and the driven system is of particular advantage in marine and vehicular applications as well as in any similar applications in which the aforementioned factors are critical.

Referring now to Figure 3, an inductor drum 110 is suitably secured to a driving shaft 112. A rotatable driven member 116 is secured to a driven shaft 134 extending within the driving shell 110. A single annular field coil 122 is provided in the member 116 and is energizable to provide drive through the coupling as explained above in the discussion of the two-way clutch embodiment shown in Figures 1 and 2. The driving and driven shafts 112 and 134, respectively, are supported externally of the coupling and the absence of any pilot bearings between the outer and inner coupling members 110 and 116 permits the use of this coupling to accommodate both lateral and angular misalignment of the driving and driven shafts 112 and 134 with resultant eccentricity between the coupling members 110 and 116. Operation of the one-way clutch is essentially the same as the operation of either side of the previously described two-way clutch.

Although only two specific embodiments of the invention have been disclosed in detail, it will be appreciated that the improvements thereof may be embodied in other and widely differing specific structures. Accordingly, the disclosures herein of specific embodiments of the invention are to be taken in an illustrative and not in a limiting sense.

I claim:

1. In a magnetic coupling device including at least a pair of coupling members mounted for rotation relative to each other and having opposed face portions in spaced relation to each other, means for adapting one of said members to act as a driving member and for adapting the other of said members to apply a driving force to a load, means for establishing a magnetic field between said face portions, magnetic bonding material intermediate said face portions and responsive to said field to establish a load transmitting bond between said face portions whereby rotation of said one member tends to cause rotation of said other member, and means for supporting said one member and said other member to permit angular and lateral misalignment therebetween, said bonding material accommodating any such angular and lateral misalignment between said members and tending to center said members under rotative operative conditions thereby damping pullover between said members due to the unbalanced magnetic forces applied thereto as a result of the permitted misalignment.

2. A magnetic coupling including a driving member and a driven member having opposed face portions, means for rotatably mounting said driving and driven members relative to each other and to permit misalignment therebetween, means for establishing a magnetic field between said face portions, and magnetic bonding material in said field responsive thereto for establishing a load transmitting bond between said face portions whereby rotation of said driving memebr tends to cause rotation of said driven member, said bonding material providing a centering action on said members under rotative operative conditions and minimizing the pullover effect therebetween due to unbalanced magnetic forces applied thereto as a result of the permitted misalignment.

3. A magnetic particle coupling including a driving member and a driven member having opposed face portions in spaced relation to each other, means for independently mounting said members for rotation relative to each other and to permit substantial misalignment therebetween, means for establishing a magnetic field between said face portions, and magnetic bonding material intermediate said face portions and responsive to said field to establish a load transmitting bond between said face portions whereby rotation of said driving member tends to cause rotation of said driven member, said bonding material accommodating said misalignment and minimizing the pullover effect between said members under normal operating conditions of said coupling due to unbalanced magnetic forces applied therebetween as a result of such eccentricity.

4. A magnetic coupling mechanism including a plurality of magnetic field coil members rotatably mounted relative to each other and adapted to be selectively energized to establish a magnetic field, a magnetic inductor member rotatably mounted relative to said coil members, said coil members having face portions thereon opposed to and spaced from face portions on said inductor member, magnetic bonding material between said opposed face portions and responsive to the selective energization of said field coil members to establish a load transmitting bond between the inductor member and the field coil members so energized, and means supporting said field coil members and said inductor member to permit substantial misalignment therebetween, said bonding material accommodating such misalignment and damping rotative and magnetic unbalance induced thereby.

5. A magnetic coupling mechanism including at least three magnetic members rotatably mounted relative to each other, one of said members having face portions in opposing spaced relation to face portions on at least two of the other of said members, means energizable to selectively establish magnetic fields magnetically interconnecting the face portions of said one member with the opposed face portion of at least one of said other members, magnetic bonding material between said opposed face portions and responsive to the selective energization of said magnetic fields to establish a load-transmitting bond between the field interconnected face portions of said members, and means supporting said one and said second magnetic members to permit substantial misalignment therebetween, said bonding material accommodating said misalignment and providing a centering action on said members under rotative operative conditions and damping rotative and magnetic unbalance induced by such eccentricity.

6. A magnetic coupling mechanism including a first rotatably mounted magnetic member, a second magnetic member rotatably mounted coaxially with said first member in spaced axial relation therefrom, a third magnetic member rotatably mounted relative to said first and second members, said first and second members having face portions thereon in opposing spaced relation to face portions on said third member, means selectively energizable to establish magnetic fields magnetically interconnecting the opposed face portions of said members, magnetic bonding material between said opposed face portions and responsive to the selective energization of said magnetic fields to establish a load transmitting bond between said third member and said first and second members, a web carried by said third member and extending intermediate said first and second members, and a self-aligning bearing carried by said web and journaling said third member relative to said first and second members to permit angular misalignment between said third member and said first and second members about a point coaxial to and intermediate said first and second members, said bonding material accommodating lateral displacement of said first and second members with respect to said third member due to said angular misalignment and damping the effect of unbalanced rotative and magnetic forces acting on said laterally displaced members.

7. A drive adapted for connecting a prime mover and a reversing gear box having the possibility of slight misalignment between their center lines, the gear box having first and second drive means; comprising electromagnetic couplings constituted by a common driving member and an assembly of relatively rotary individual driven members separated from the common driving member by small running gaps, said driven members being attached respectively to said first and second means, means selectively energizable to establish first and second magnetic fields magnetically interconnecting said common driving member with said driven members across said running gaps, a flowable magnetic material in each of said gaps and responsive to the establishment of a magnetic field between said driving member and one of said driven members to establish a load transmitting bond therebetween, a support for said common driving member including a bearing capable of angular articulation between said driving member and said driven members but of substantially no axial movement therebetween, said bearing being located on said assembly axially between the ends of said driven members, and means for supporting and drivingly connecting said common driving member to be rotatably driven by the prime mover, said flowable material accommodating misalignment between said driving and driven members and damping rotative and magnetic unbalance forces applied thereto as a result of the permitted misalignment.

8. A compound electromagnetic slip coupling comprising a common driving member of cylindric form, an assembly of cylindric relatively rotary coaxial driven members axially spaced from one another, said driven members being separated from the common driving member by small running gaps, the assembly of said driven members being constituted by a non-articulating bearing between said driven members, means selectively energizable to establish first and second magnetic fields magnetically interconnecting said common driving member with said driven members across said running gaps, a flowable magnetic material in each of said gaps and responsive to the establishment of a magnetic field between said driving member and one of said driven members to establish a load transmitting bond therebetween, a support for said common driving member including an articulating bearing capable of angular articulation but substantially no coaxial movement and located on said assembly in a position between the ends of said driven members, said support also including a radial member extending from said articulating bearing to a connection with said common driving member which is located between said axially spaced driven members, and means for supporting and drivingly connecting said common driving member for rotation by a prime mover, said magnetic flowable material accommodating the articulation permitted at said articulating bearing and damping the effect of the unbalanced rotative and magnetic forces acting on said driving and driven members as a result of such articulation.

9. A compound electromagnetic slip coupling comprising a common driving member of cylindric form, an assembly of cylindric relatively rotary coaxial driven members axially spaced from one another, said driven members being separated from the common driving member by small running gaps, the assembly of said driven members being constituted by a non-articulating bearing between said driven members, means selectively energizable to establish first and second magnetic fields magnetically interconnecting said common driving member with said driven members across said running gaps, a flowable magnetic material in each of said gaps and responsive to the establishment of a magnetic field between said driving member and one of said driven members to establish a load transmitting bond therebetween, a support for said common driving member including an articulating bearing capable of angular articulation but substantially no coaxial movement and interposed between said common driving member and said assembly in a position between the ends of said driven members, and means for supporting and connecting said common driving member for driving rotation by a prime mover, and said magnetic flowable material accommodating the articulation permitted at said articulating bearing and damping the effect of unbalanced magnetic forces resulting from such articulation between said driving and driven members.

References Cited in the file of this patent

UNITED STATES PATENTS

| | | |
|---|---|---|
| 2,097,922 | Hodgson | Nov. 2, 1937 |
| 2,287,953 | Winther | June 30, 1942 |
| 2,525,571 | Winther | Oct. 10, 1950 |
| 2,543,394 | Winther | Feb. 27, 1951 |
| 2,544,360 | Schmidt | Mar. 6, 1951 |
| 2,605,876 | Becker | Aug. 5, 1952 |
| 2,615,945 | Jaeschke | Oct. 28, 1952 |
| 2,617,507 | Feiertag | Nov. 11, 1952 |
| 2,629,552 | Dickey | Feb. 24, 1953 |
| 2,695,675 | Frye | Nov. 30, 1954 |
| 2,725,133 | Winther | Nov. 29, 1955 |
| 2,794,525 | Winther | June 4, 1957 |

FOREIGN PATENTS

| | | |
|---|---|---|
| 846,920 | France | June 19, 1939 |
| 53,057 | France | Sept. 18, 1944 |
| | (1st addition to 890,182) | |
| 256,303 | Switzerland | Feb. 16, 1949 |
| 993,797 | France | July 25, 1951 |
| 1,042,719 | France | June 10, 1953 |
| 694,898 | Great Britain | July 29, 1953 |